(12) United States Patent
Schaake et al.

(10) Patent No.: US 10,976,004 B2
(45) Date of Patent: Apr. 13, 2021

(54) COMPOSITE FITTING

(71) Applicant: Aktiebolaget SKF, Gothenburg (SE)

(72) Inventors: Richard Schaake, Utrecht (NL); Jiying Fan, Houten (NL)

(73) Assignee: Aktiebolaget SKF, Gothenburg (SE)

( * ) Notice: Subject to any disclaimer, the term of this patent is extended or adjusted under 35 U.S.C. 154(b) by 463 days.

(21) Appl. No.: 15/908,188

(22) Filed: Feb. 28, 2018

(65) Prior Publication Data

US 2019/0072230 A1    Mar. 7, 2019

(30) Foreign Application Priority Data

Mar. 3, 2017  (DE) .......................... 102017203477.7

(51) Int. Cl.
| | |
|---|---|
| *F16M 13/02* | (2006.01) |
| *B29C 70/74* | (2006.01) |
| *F16B 5/00* | (2006.01) |
| *B29C 70/24* | (2006.01) |
| *F16B 7/04* | (2006.01) |
| *B29C 45/14* | (2006.01) |
| *F16B 5/06* | (2006.01) |

(Continued)

(52) U.S. Cl.
CPC ......... *F16M 13/02* (2013.01); *B29C 45/1459* (2013.01); *B29C 45/14631* (2013.01); *B29C 70/24* (2013.01); *B29C 70/742* (2013.01); *F16B 5/00* (2013.01); *F16B 5/02* (2013.01); *F16B 7/04* (2013.01); *F16B 7/18* (2013.01); *B29K 2307/04* (2013.01); *B29L 2031/738* (2013.01); *F16B 5/0614* (2013.01)

(58) Field of Classification Search
CPC .............. F16M 13/025; B29C 45/1459; B29C 45/14631; B29C 70/24; B29C 70/742; E04B 2001/3282; E04B 2002/725; Y10T 403/42; Y10T 403/73
USPC .................. 403/205, 403; 248/200; 264/45.3
See application file for complete search history.

(56) References Cited

U.S. PATENT DOCUMENTS

| | | | | |
|---|---|---|---|---|
| 4,067,168 A | * | 1/1978 | Thurner | ................... E04B 5/29 52/854 |
| 4,450,610 A | | 5/1984 | Schaper | |

(Continued)

FOREIGN PATENT DOCUMENTS

| | | |
|---|---|---|
| CN | 103963588 A | 8/2014 |
| CN | 104520094 A | 4/2015 |

(Continued)

*Primary Examiner* — Amber R Anderson
*Assistant Examiner* — Alexus Camero
(74) *Attorney, Agent, or Firm* — Garcia-Zamor Intellectual Property Law; Ruy Garcia-Zamor; Bryan Peckjian

(57) ABSTRACT

A fitting for connecting first and second components arranged at right angles to each other that includes a flange part, which extends in a first direction and has a first connection surface in contact with the first component, and which has at least one first connection hole formed by a bore of a first insert; and a base part, which extends in a second direction, perpendicular to the first direction, and has a second connection surface in contact with the second component, and which has at least one second connection hole formed by a bore of a second insert. The first insert is joined to the second insert by at least one loop of continuous fiber tow wound around radially outer surfaces of the first insert second inserts.

14 Claims, 4 Drawing Sheets

(51) Int. Cl.
  *B29K 307/04* (2006.01)
  *F16B 7/18* (2006.01)
  *F16B 5/02* (2006.01)
  *B29L 31/00* (2006.01)

(56) References Cited

U.S. PATENT DOCUMENTS

| | | | | |
|---|---|---|---|---|
| 4,556,592 | A * | 12/1985 | Bannink, Jr. | B29C 65/601 428/43 |
| 5,979,130 | A * | 11/1999 | Gregg | E04B 1/2604 403/190 |
| 6,250,041 | B1 * | 6/2001 | Seccombe | E04C 3/32 52/712 |
| 6,324,940 | B1 | 12/2001 | Pazdirek | |
| 7,299,593 | B1 * | 11/2007 | diGirolamo | E04B 2/58 52/241 |
| 8,387,321 | B2 * | 3/2013 | diGirolamo | E04B 2/58 52/242 |
| 8,925,880 | B2 * | 1/2015 | Valembois | B29C 70/345 248/200 |
| 9,447,802 | B2 * | 9/2016 | Valembois | F16B 5/01 |
| 9,598,104 | B1 * | 3/2017 | Lam | B62D 7/18 |
| 2007/0264470 | A1 * | 11/2007 | Wellman | B32B 27/306 428/105 |
| 2013/0062012 | A1 | 3/2013 | Masson | |
| 2013/0209162 | A1 * | 8/2013 | Buchin | F16B 12/46 403/205 |
| 2019/0072230 | A1 | 3/2019 | Schaake | |

FOREIGN PATENT DOCUMENTS

| | | | | |
|---|---|---|---|---|
| CN | 105008068 A | | 10/2015 | |
| DE | 102014226408 A1 * | | 6/2016 | B29C 45/1671 |
| EP | 2379313 A1 | | 10/2011 | |
| EP | 2474747 A1 * | | 7/2012 | F03D 80/00 |
| WO | 2014195484 A2 | | 12/2014 | |
| WO | WO-2014195484 A2 * | | 12/2014 | F16C 33/581 |

\* cited by examiner

COMPOSITE FITTING

CROSS-REFERENCE

This application claims priority to German patent application no 102017203477.7 filed on Mar. 3, 2017, the contents of which are fully incorporated herein by reference.

TECHNOLOGICAL FIELD

The present invention relates generally to the field of connectors and is particularly directed to a fitting made of fiber-reinforced polymeric material having connection holes in perpendicular planes.

BACKGROUND

Angled fittings or brackets for connecting two or more members are well known in the art. When intended to connect surfaces that are generally perpendicular to each other, such fittings/brackets often have a geometry that is essentially L-shaped or essentially T-shaped. In aerospace applications, where weight and strength are important considerations, composite materials are increasingly being used in the manufacture of fittings.

One example of a composite L-shaped fitting is known from U.S. Pat. No. 8,925,880. The fitting is made by placing pre-impregnated fibers in the form of fabrics or mats into a mold with a specific geometry. The fitting comprises two portions which are essentially perpendicular to each other in which connection holes are provided. One of the portions has at its inner side a concave curved profile, whereby the hole or holes provided in that portion have an axis radial to the curvature.

An example of a T-shaped fitting having three branches provided with connection holes is disclosed in U.S. Pat. No. 9,447,802. The branches are molded from a fiber-reinforced thermoplastic or thermoset matrix and extend radially from a joining zone. The joining zone has a cross-section in transverse direction in the shape of a polygon with concave sides.

There is still room for improvement.

SUMMARY

The invention resides in a fitting for connecting first and second components which are generally arranged at right angles to each other. The fitting comprises a flange part which extends in a first direction and a base part which extends in a second direction, generally perpendicular to the first, whereby a main body of the flange and base parts is made of molded fiber composite material. The flange part has a first connection hole formed by a first hollow insert arranged in the main body of the flange part, whereby a bore of the first insert is adapted to receive a fastener element for connecting the flange part to the first component. Similarly, the base part has a second connection hole formed by a second hollow insert arranged in the main body of the base part, whereby a bore of the second insert is adapted to receive a fastener element for connecting the base part to the second component. According to the invention, the fitting further comprises a continuous fiber tow that is looped around part of the radially outer surfaces of the first and second inserts. The continuous fiber tow extends generally in the first direction within the flange part of the fitting and extends generally in the second direction within the base part and follows a curved path within a transition zone between the flange part and the base part.

In use of the fitting, forces acting on one of the first and second components are transferred to the other component through the fitting, via the first and second connection holes. Thus, by interconnecting the holes using a continuous fiber tow, fiber reinforcement is located at and in alignment with the load path, giving the fitting improved strength and stiffness where is needed most. Furthermore, the curved path followed by the continuous fiber tow in the transition zone between the flange part and the base part creates an optimal tensile load path, allowing tensile forces to be taken up by the continuous fiber tow, while compressive loads are taken up by the molded main body.

To improve the strength of the fitting in use, it is beneficial to apply a compressive force on the continuous fiber tow in transverse direction. In a preferred embodiment, the fitting forms part of a connection bracket comprising a washer having a through hole for receiving the shank of a fastener element, which through hole is in alignment with the second connection hole in the base part. An upper surface of the washer may be flat for receiving e.g. the head of fastener element. An underside of the washer exerts a clamping force on an upper surface of the base part of the fitting, when the fastener is e.g. screwed into the second component. In order to exert a compressive force in transverse direction on the continuous fiber tow in the transition zone, the upper surface of the fitting preferably has a concave portion and the underside of the washer has a correspondingly convex portion at the transition zone between the base part and flange part of the fitting.

In an embodiment, the curvature of the convex portion and concave portion of the washer and fitting respectively matches the curvature of the path followed by the continuous fiber tow in the transition zone, in the sense of sharing a common centre of curvature.

Preferably, the upper surface of the base part has a concave recess, whereby the second connection hole is generally located at the lowest region of the concave recess and separates the base part into first and second sides. The flange side of the base part will be designated as the first side; the side distal from the flange will be designated as the second side.

The strength of the fitting may be further improved by allowing the continuous fiber tow to extend into a second side of the base part, above a top level of the second connection hole. Suitably, the upper surface of the base part comprises a second concave portion at the second side of the base part. In an advantageous embodiment, the continuous fiber tow follows a curved path within the second side of the base part, which curved path shares a centre of curvature with the second concave portion. As will be understood, the underside of the washer is suitably shaped to fit against the second concave portion, to exert a compressive force in transverse direction on the continuous fiber within the second side of the base part.

To guide the continuous fiber tow in the desired curved path, the radially outer surface of the second insert may be shaped so as to curve towards the upper surface of the base part at the first and second sides of the second connection hole. In an embodiment, the radially outer surface of the second insert is provided with at least one groove or recess or rim for retaining and guiding the fiber tow during the winding process. Preferably, the radially outer surface of the first insert is likewise provided with at least one groove or recess.

In one example, the inserts have a groove in the outer surface with a width that is essentially equal to the dimensions of the fiber tow. Typically, the fiber tow has a diameter of 0.5-1.5 mm. During the winding process, the fiber tow is wound around the groove, which helps to keep the fiber tow in place, thereby facilitating pre-tensioning. Additional loops of the fiber tow may be wound around the loop that is retained in the groove. In other examples, the radially outer surface of the hollow inserts is roughened.

To facilitate compression of the continuous fiber tow in transverse direction, when the washer is clamped onto the fitting, the second insert may be made of e.g. a polymer material with a stiffness that is approximately equal to or less than the stiffness of the fiber tow in transverse direction. This ensures that even if loops of the fiber tow are fully retained within a recessed surface of the second insert, e.g. between an upper rim and a lower rim, compression of the fiber tow occurs. The second insert may also be made from a stiffer material, such as a ceramic or a lightweight metal. In this case, the second insert is suitably designed to enable clamping of the fiber tow. For example, the radially outer surface may have only an upper rim for guiding and retaining the fiber tow.

In some embodiments, the concave recess in the upper surface of the base part has a line of symmetry, such that the curvature of the recess is equal at either side of the second connection hole. In other embodiments, the curvature may be different at either side of the second connection hole. For example, the recess may be more curved at the first side (flange side) than at the second side. The convex underside of the washer may likewise have an equal or a different curvature at either side of its through hole.

The washer may be made of a metal material, a ceramic material a polymer material or a composite polymer material. In some embodiments, the washer is a separate part. In other embodiments, the washer is joined to the upper surface of the base part, to form an integral assembly.

In an example, the washer is molded from a fiber-reinforced polymer material and is joined to the fitting in a curing process, after the main body of the fitting has been molded around the inserts and the continuous fiber tow. In other words, the material of the washer and of the fitting main body is cured in a single process, such that there is molecular chain bonding between the two materials. Typically, the curing process involves the application of heat. In other examples, the washer may be bonded to the fitting using an adhesive.

The main body of the fitting may be made from sheet molding compound (SMC), bulk molding compound (BMC), long-fiber thermoplastic (LFT), direct long-fiber thermoplastic. Other polymer composite materials may also be used. The continuous fiber tow is a bundle of fibers, which may consist of dry fiber tows, impregnated fiber tows or impregnated composite tapes. Examples of suitable materials for the continuous fiber tow include carbon, aramid, glass and high-density polyethylene (HDPE). Advantageously, different types of fiber may be incorporated within the continuous fiber tow, depending on the properties required. For example, an aramid fiber such as Kevlar□ may be selected to provide energy absorption and safety in response to impact loads. A high-modulus carbon fiber may be selected to enhance stiffness. Alternatively or additionally, a high-strength carbon fiber may be selected to increase strength and load-carrying capacity.

As will be understood, the type of fiber, the number of fibers in the continuous fiber tow and the number of loops around the first and second inserts are selected depending on the application loads in question.

In some embodiments, the fitting is essentially L-shaped. In other embodiments, the fitting is essentially T-shaped and comprises a central flange portion. The base part then has first and second sections that extend from the central flange portion in opposite, generally perpendicular, directions. A connection hole formed by a second hollow insert is provided in each of the first and second sections and is joined to the first hollow insert in the flange part using a continuous fiber tow as described above.

The flange part of the fitting may comprise one or more connection holes formed by a first hollow insert having a bore axis that is normal to the connection surface of the first component. Similarly, the base part of an L-shaped fitting or the first and second sections of the base portion of a T-shaped fitting may comprise one or more connection holes formed by a second hollow insert having a second bore axis that is normal to the connection surface of the second component. Each second insert having a second bore axis is connected to at least one first insert having a first bore axis using a continuous fiber tow that is wound around the radially outer surface of the inserts and which follows a curved path in the transition zone between the flange and base portions.

The present invention further defines a method of manufacturing a fitting comprising a flange part that extends in a first direction and a base part that extends therefrom in a second direction, whereby the flange part has a first connection surface and the base part has a second connection surface that is generally perpendicular to the first connection surface. The method comprises steps of:

placing at least one first insert in a suitably shaped mold for forming the fitting, the first insert having a bore with a first bore axis that is normal to the first connection surface;

placing at least one second insert in the mold, the second insert having a bore with a second bore axis that is normal to the second connection surface;

winding a continuous fiber tow around part of a radially outer surface of the first and second inserts, so as to form at least one loop; whereby the continuous fiber extends in the first direction within the flange part and extends in the second direction within the base part and is guided so as to follow a curved path, when viewed in a third direction, perpendicular to the first and second directions, in a transition zone between the first and second directions; and molding a main body of the fitting around the first and second inserts and the continuous fiber tow using a molding compound.

In a further development of the method, the fitting is shaped to have a concave recess in an upper surface of the base part and the method further comprises a step of joining a washer to the upper surface of the base part, whereby the washer has a correspondingly convex underside and a through hole in alignment with the bore of the second insert.

In a still further development, the convex underside of the washer is used during the step of winding to guide the continuous fiber tow in a curved path in the transition zone.

Thus, a composite fitting comprising fibers in alignment with the load path can be created, without the need to drill holes. Other advantages will become apparent from the detailed description and accompanying drawings.

DETAILED DESCRIPTION

Figure 1:
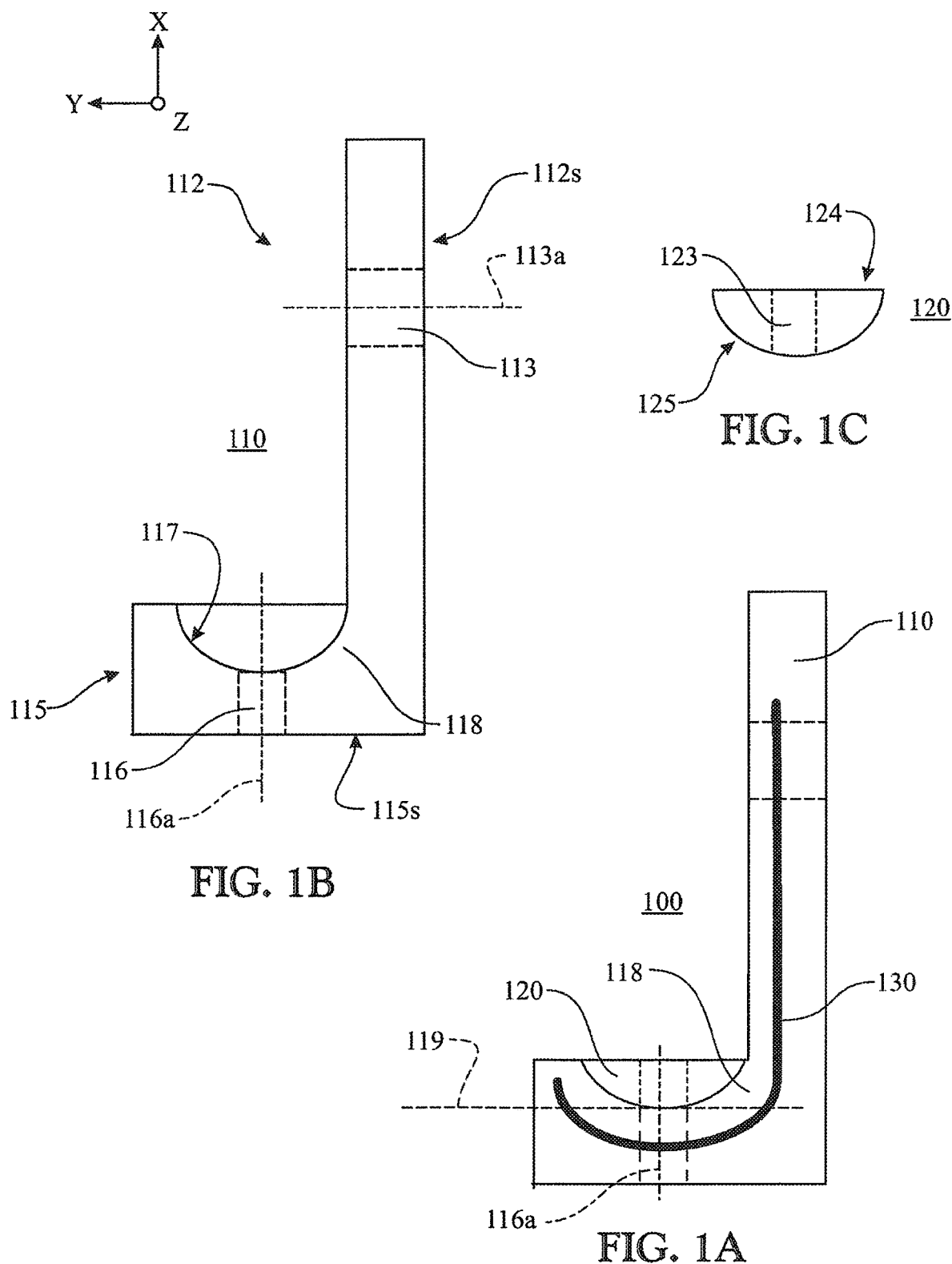
FIG. 1A is a side view of a connection bracket comprising an L-shaped fitting according to the invention and a washer.
FIG. 1B and FIG. 1C respectively show a side view of the fitting and the washer from FIG. 1A.

FIG. 1A shows a side view of a connection bracket 100 comprising an example of a composite fitting 110 according to the invention, and a washer 120. A side view of the fitting and washer are respectively shown in FIG. 1B and FIG. 1C. In use, the bracket 100 is adapted to connect first and second components that are generally arranged at right angles to each other. The fitting 110 has a flange part 112 that extends in a first direction x and a base part 115, that extends in a second direction y, perpendicular to the first direction. The flange and base parts have respective first and second connection surfaces 112s, 115s which in use of the bracket 100 are in contact with corresponding connection surfaces on the first and second components. In this example, one first connection hole 113 is provided in the flange part 112, which has a first hole axis 113a, perpendicular to the first connection surface 112s. The base part is provided with two second connection holes 116, which are spaced from each other in a third direction z, which is perpendicular to the first and second directions. The two second holes are aligned in the second direction y, and the location of only one of the holes is indicated in FIG. 1A and FIG. 1C via dashed lines. Each second connection hole 116 has a second hole axis 116a that is perpendicular to the second connection surface 115s.

The bracket 100 further comprises a washer 120, which has two through holes 123 of the same size and in alignment with the second connection holes 116 in the base part of the fitting. In use, the shank of a fastener element such as a bolt passes through the aligned holes 123 and 116 in the washer and base part of the fitting and into the second component. Suitably, an upper surface 124 of the washer is flat for receiving the bolt head. Advantageously, a lower surface 125 of the washer has a concave profile and fits into a correspondingly concave recess in an upper surface 117 of the base part 115 of the fitting. Such a geometry is advantageous in view of the composite material from which the fitting is made, which will be explained in more detail later.

A main body of the flange and base parts of the fitting is made of a fiber-reinforced molding compound such as long-fiber thermoplastic, which may be formed in an injection molding or compression molding process. The first and second connection holes are formed by corresponding first and second hollow inserts around which the main body of the fitting is molded. According to the invention, the fitting comprises further fiber reinforcement in the form of a continuous fiber tow 130 that is looped around part of the outer surface of the first hollow insert in the flange part 112 and each second hollow insert in the base part 115. In a transition zone 118 between the flange and base parts, where the direction of fiber extension changes from the first direction x to the second direction y, the fiber tow 130 follows a curved path within the fitting 110. The path followed by only one section of the continuous fiber tow 130 has been indicated in FIG. 1a, so as not to obscure the drawing.

Figure 2:
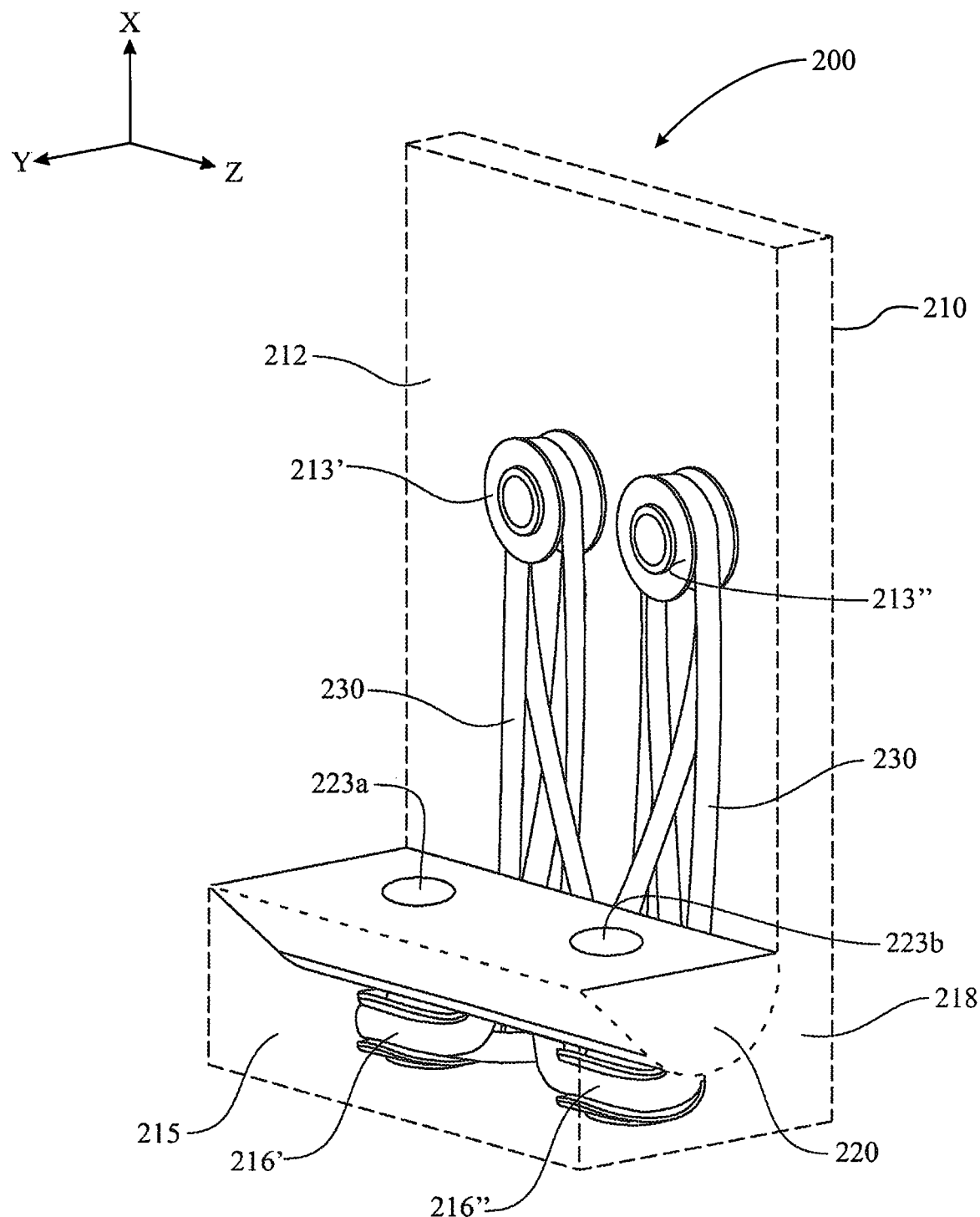
FIG. 2 is a perspective view of a further example of a connection bracket comprising a fitting according to the invention and a washer, in which a main body of the fitting is shown as transparent.

The principle of the invention can be better seen in FIG. 2, which is a perspective view of a further example of a connection bracket 200 comprising a fitting 210 according to the invention, in which the main body of the flange and base parts has been made transparent. Components of the further example are shown individually in FIG. 3.

In this example, the flange part 212 of the fitting has two connection holes formed by the bore of two first inserts 213', 213", which are spaced from each other in the third direction z. The base part 215 of the fitting also has two connection holes formed by the bore of two second inserts 216', 216" which are spaced in the third direction z. A bore axis 213a, 216a of the first and second inserts is perpendicular to the first and second connection surfaces 212s, 215s of the fitting 210 respectively (refer FIG. 3).

Again, the main body of the fitting is molded using a fiber-reinforced polymer such as a bulk molding compound. Before molding, the two first inserts 213', 213" and two second inserts 216', 216" are arranged within a suitable mold for forming the fitting 210. A continuous fiber tow 230 is looped around a radially outer surface 213s of one of the inserts e.g. one of the first inserts 213' and is then guided in the first direction x towards what will become the base part 215 of the fitting. The tow 230 is then guided in the second direction y. In a transition zone 218 between the first and second directions, the fiber tow 230 is guided in a curved path, such as shown in FIG. 1A. The tow 230 is then looped around a radially outer surface 216s of one of the second inserts 216', and then guided back in the second direction y towards what will become the flange part 212 of the fitting and then back in the first direction x towards the other first insert 213" and looped around part of the radially outer surface of that insert 213". Again in the transition zone 218 between the first and second directions, the fiber is guided in a curved path. The process is repeated until each first insert 213', 213" is connected to each second insert 216', 216" via at least one fiber tow loop. Typically, the inserts are interconnected using several loops, whereby the exact number depends on the application loads for which the fitting is designed.

Loads on the components connected by the fitting are transferred through the fitting via the connection holes. The fiber tow 230 is thus located along the load path, giving the fitting 210 improved strength and stiffness where it is needed most. Furthermore, by guiding the fiber tow 230 in a curved path in the transition zone between the first and second directions, an optimal tensile load path along the fiber tow can be created. Tensile loads are thus mainly taken up by the continuous fiber tow, which is obviously beneficial given that fibers have maximum strength under tension. Compressive loads are mainly taken up by the molded main body of the fitting.

The connection bracket depicted in FIG. 2 is again provided with a washer 220 which has two connection holes 223a, 223b with a hole axis in alignment with the bore axis 216a of the two second inserts 216', 216". In use of the bracket, when a fastener element such as a bolt is inserted through each aligned set of holes in the washer and base part 215 of the fitting, an underside 225 of the washer is pressed against an upper surface 217 of the base part, which exerts a compressive force on the fibers of the continuous fiber tow 230 within the base part 215. This clamping of the fibers in transverse direction improves the strength of the fitting 210. It is also beneficial to exert a clamping force on the fibers in the transition zone, which follow a curved path.

Suitably, the upper surface 217 of the fitting base part 215, opposite from the connection surface 215s, has a concave profile when viewed in the third direction z, whereby the bore axis 216a of the second inserts 216', 216" may be generally located at a lowest region along the concave profile in the second direction y. At a first side of the base part 215, closer to the flange part 212 of the fitting, the curvature of the concave surface profile preferably matches the curvature of the curved path followed by the sections of the continuous fiber tow 230 in the transition zone 218. In other words, the curved path of the fiber tow 230 in the transition zone has a common center of curvature with the concave profile of the upper surface 217.

Thus, to provide effective clamping of the fibers in the transition zone, the washer 220 has a correspondingly convex lower surface 226. In an advantageous further development, the strength of the fitting is further improved by clamping the fibers also at a second side of the base part 215, distal from the flange part 212.

As best seen in FIG. 1A, the fiber reinforcement formed by the fiber tow 130 extends into the second side of the base part 115, beyond the second connection holes 116 in the second direction y and extends in the first direction x away from the second connection surface 115s, beyond a top level of the second connection holes, indicated with reference numeral 119. Again the continuous fiber tow 130 preferably follows a curved path at the second side of the base part 115, where the base part also has a concave profile of matching curvature. The underside 125 of the washer is correspondingly convex.

The washer may have a semi-cylindrical underside and the base part of the fitting may have a semi-cylindrical recess, such as shown in the embodiment of FIG. 1B and FIG. 1C, whereby the curvature is essentially equal at either side of the second connection hole axis 116a, viewed in the third direction z. Alternatively, such as in the embodiment of FIG. 2, the curvature of the mating surfaces of the washer 220 and base part 212 of the fitting may be different at either side of the common hole axis, viewed in the third direction z. It is also possible to use a washer with a semi-cylindrical underside, i.e. with a symmetrical curvature, in combination with the fitting of FIG. 2.

In the depicted examples, the washer is a single part comprising the same number of through holes as in the base part of the fitting. In other examples, the connection bracket comprises a number of separate washers, each of which is provided with one connection hole. Each washer may have a hemispherical underside. The washer is preferably also a molded component made from a composite material such as bulk molding compound, sheet molding compound, long-fiber thermoplastic or other suitable material. Ceramic materials or lightweight metals such as aluminum and titanium may also be used.

In a preferred embodiment, such as shown in FIG. 2, the continuous fiber tow 230 is guided in a curved path with the aid of the second inserts 216', 216", which have a specially adapted geometry. One of the second inserts 216' is shown in perspective view in FIG. 3. Suitably, the insert 216' has a has a cylindrical bore, for receiving the shank of a fastener element, such as described above. The radially outer surface 216s, around which the continuous fiber tow 230 is looped, is non-cylindrical and may be constituted by a groove or recess, so that the fiber tow 230 can be retained and guided along the surface contour. The second insert is elongated in the second direction y, relative to the third direction z, and has a curved profile when viewed in the third direction. At first and second sides of the bore axis 216a of the second insert, the insert 216' has a curvature that suitably corresponds to the curvature of the concave top surface 217 of the base part 215 of the fitting at respective first and second sides of the base part. The fiber tow 230 is thus guided in a curved path. The dimensions of each second insert are preferably such that when the continuous fiber tow 230 is looped around the recessed radially outer surface 216s of each second insert, the tow 230 extends beyond a top level of the cylindrical bore (see line 119 in FIG. 1A).

The radially outer surface 213s of the first inserts 213' and 213" in the flange part 212 of the fitting may be cylindrical in shape and suitably also comprises a groove or recess for retaining and guiding the continuous fiber tow 230 during the winding process. The first and second inserts may be made of a metal material, preferably a lightweight metal such as aluminum or titanium, or may be molded from a suitable thermoplastic material.

Figure 3:
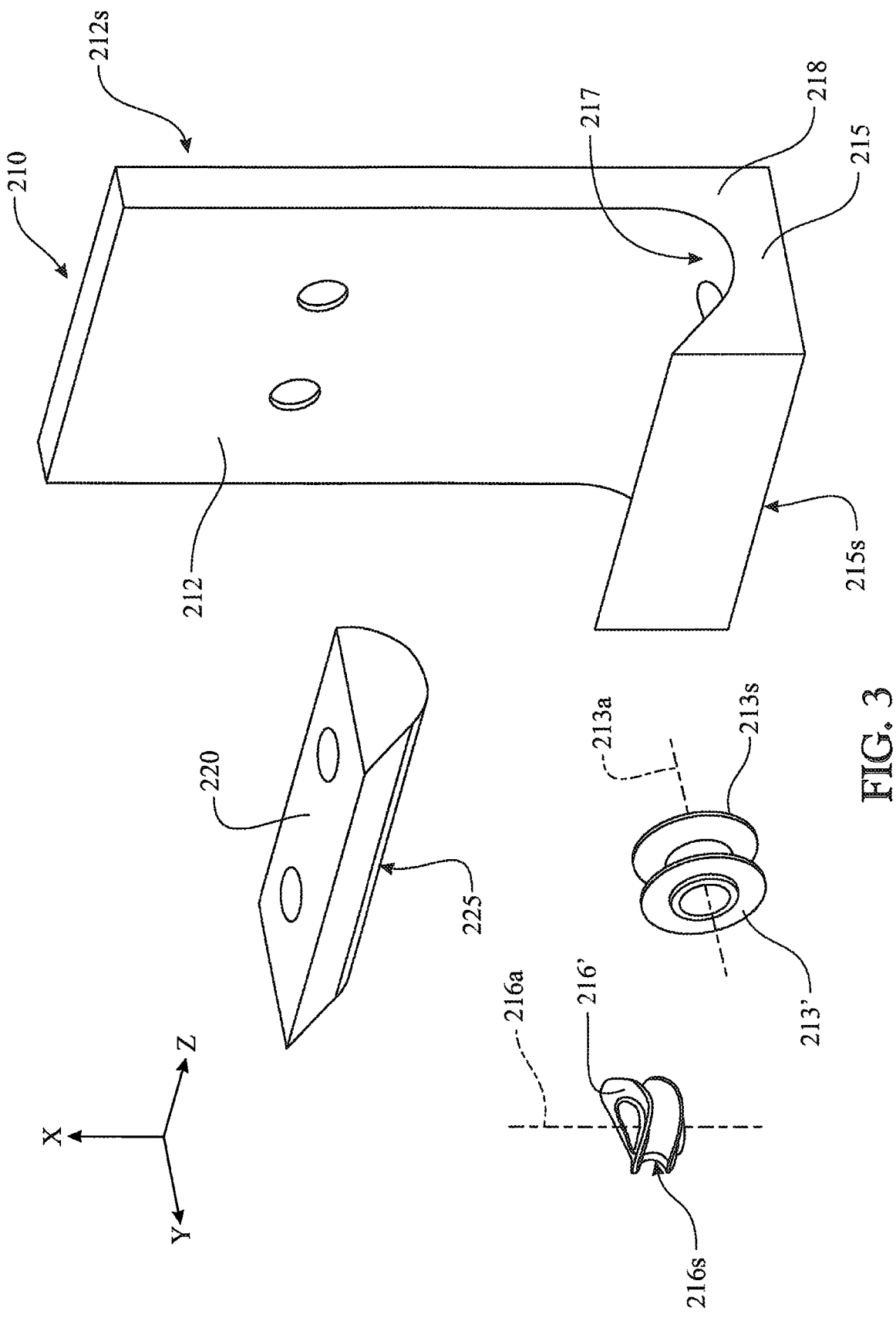
FIG. 3 shows a perspective view of components of the bracket from FIG. 2.

In the example depicted in FIG. 2 and FIG. 3, each second insert 216', 216" has a radially outer surface 216s that is recessed relative to upper and lower rims of the insert. To enable clamping of the fibers in the tow 230 in transverse direction, the second inserts are made of a polymer material with a stiffness that is less than or equal to the stiffness of the fiber tow 230 in transverse direction. In embodiments where the second insert is made of a stiffer material, the design of the insert is suitably modified. For example, the insert 216, 216" may have only an upper rim and no lower rim.

In the transition zone 218 between the base part 215 and flange part, the loops of the continuous fiber tow 230 may be partly guided by the curvature of the second inserts 216', 216". Suitably, an additional guide element having an appropriately convex surface is arranged in the mold for guiding the continuous fiber tow in the transition zone during the winding process. The guide element may be a temporary tool that is removed from the mold after the winding process is complete. In an advantageous embodiment, the washer 220 is used as the guide element, whereby the loops of the continuous fiber tow 230 are guided on the convex underside 225 at the first side (flange side) of the washer.

For example, the washer 220 may be held fixed in the mold such that the two connection holes 223a, 223b are in alignment with the bore axis 216a of the second inserts 216', 216". The continuous fiber tow 230 is then wound as described above to connect each first insert 213', 213" to each second insert 216', 216" via at least one loop, using the curvature of the second inserts and of the underside 225 of the washer to create the desired path. In a next step, the fitting is molded around the inserts and the washer underside 225 using e.g. an injection molding process.

Figure 4:
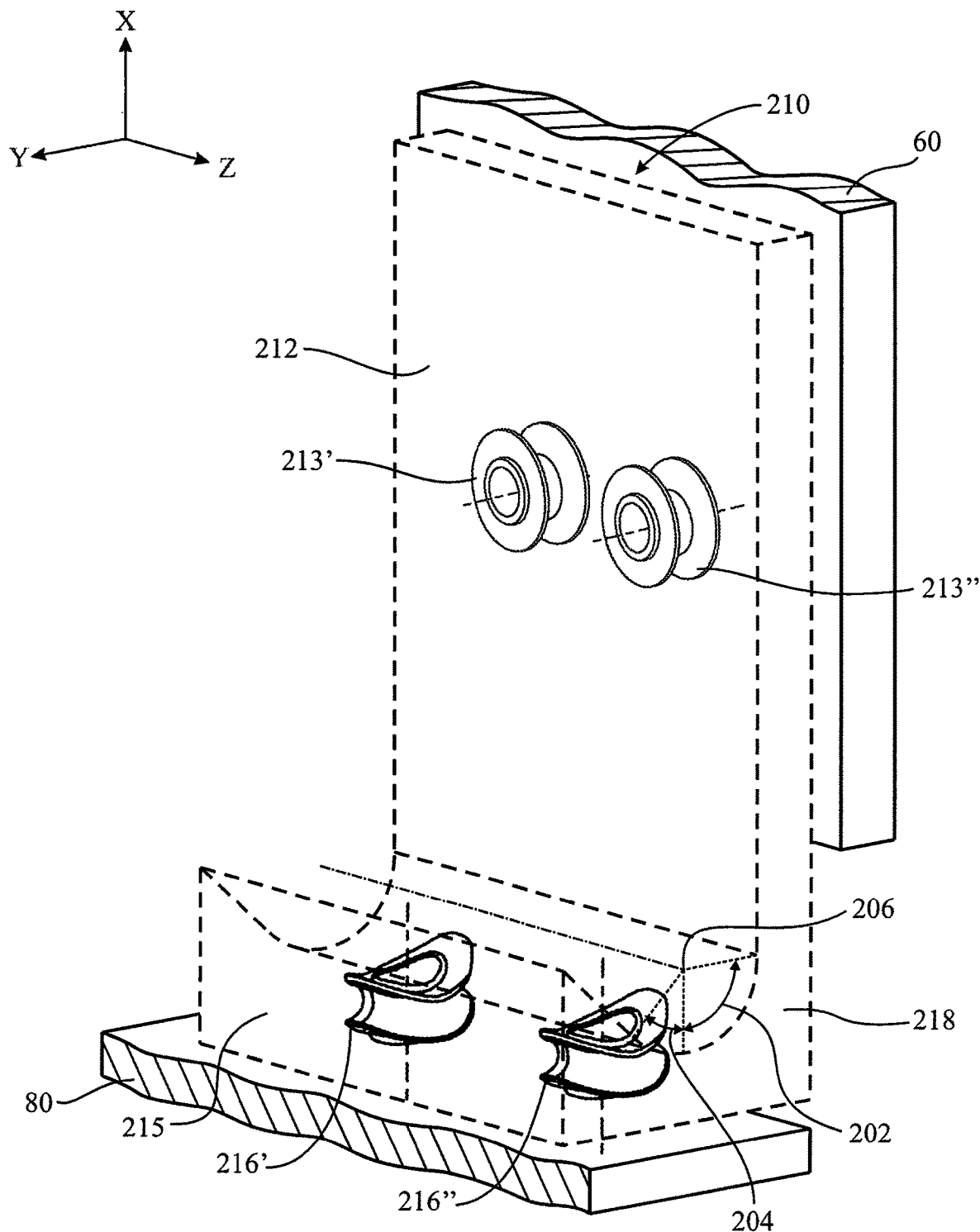
FIG. 4 shows a perspective view of the fitting attached to first and second components.

The example depicted in FIG. 4 shows the composite fitting attached to first 60 and second 80 components arranged at a right angle to one another. One with ordinary skill in the art will appreciate the fitting can be used for components of various types and is not limited to a specific component. FIG. 4 also shows an example of the curvature on the base part. In the example there is a first curvature 202, a second curvature 204, and a center of curvature 206. One with ordinary skill in the art will appreciate that the first and second curvatures are not limited to the example depicted, and that the center of curvature for the first curvature may differ from that of the second curvature.

In a still further development, the washer is made of a polymer material, preferably a fiber-reinforced composite polymer such as bulk molding compound, and is joined to the base part of the fitting via a curing process. After molding of the base part, the step of curing, which may comprise the application of heat, cures the material of the fitting main body and the material of the washer, so as to create a molecular chain bond therebetween.

A lightweight and robust connection bracket can thus be formed.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

What is claimed is:

1. A fitting adapted to connect a first component to a second component, which is at a right angle relative to the first component, the fitting comprises:
   a first insert defining a first insert bore;
   a second insert defining a second insert bore;
   a flange part, which extends in a first direction and has a first connection surface adapted to be in contact with the first component, the first insert being located in the flange part such that a first connection hole through the flange part is formed by the first insert bore;
   and a base part, which extends in a second direction, perpendicular to the first direction, and has a second connection surface adapted to be in contact with the second component, the second insert being located in the base part such that a second connection hole through the base part is formed by the second insert bore,
   wherein a main body of the fitting is made of a fiber-reinforced polymer material that is molded around the first and second inserts,
   wherein the first insert is joined to the second insert by one or more loops of a continuous fiber tow that is wound around part of a radially outer surface of the first insert and around part of a radially outer surface of the second insert, the continuous fiber tow extends generally in the first direction within the flange part of the fitting and extends generally in the second direction within the base part and follows a curved path within a transition zone between the flange part and the base part, and
   wherein the radially outer surface of the second insert curves away from the second connection surface at each side of a bore axis when viewed in a third direction.

2. The fitting of claim 1, wherein the flange part comprises neighboring first inserts and/or the base part comprises neighboring second inserts, and wherein each of the first inserts is connected to each of the second inserts via one or more loops of the continuous fiber tow, which follows a curved path in the transition zone.

3. A fitting adapted to connect a first component to a second component, which is at a right angle relative to the first component, the fitting comprises:
   a first insert defining a first insert bore;
   a second insert defining a second insert bore;
   a flange part, which extends in a first direction and has a first connection surface adapted to be in contact with the first component, the first insert being located in the flange part such that a first connection hole through the flange part is formed by the first insert bore; and
   a base part, which extends in a second direction, perpendicular to the first direction, and has a second connection surface adapted to be in contact with the second component, the second insert being located in the base part such that a second connection hole through the base part is formed by the second insert bore,
   wherein a main body of the fitting is made of a fiber-reinforced polymer material that is molded around the first and second inserts,
   wherein the first insert is joined to the second insert by one or more loops of a continuous fiber tow that is wound around part of a radially outer surface of the first insert and around part of a radially outer surface of the second insert, the continuous fiber tow extends generally in the first direction within the flange part of the fitting and extends generally in the second direction within the base part and follows a curved path within a transition zone between the flange part and the base part, wherein an upper surface of the base part of the fitting, opposite from the second connection surface, has a concave profile when viewed in a third direction and wherein at a flange side of the base part, the upper surface of the base part has a first curvature with a center of curvature that coincides with that of the curved path followed by the continuous fiber tow in the transition zone.

4. A fitting adapted to connect a first component to a second component, which is at a right angle relative to the first component, the fitting comprises:
   a first insert defining a first insert bore;
   a second insert defining a second insert bore;
   a flange part, which extends in a first direction and has a first connection surface adapted to be in contact with the first component, the first insert being located in the flange part such that a first connection hole through the flange part is formed by the first insert bore;
   and a base part, which extends in a second direction, perpendicular to the first direction, and has a second connection surface adapted to be in contact with the second component, the second insert being located in the base part such that a second connection hole through the base part is formed by the second insert bore,
   wherein a main body of the fitting is made of a fiber-reinforced polymer material that is molded around the first and second inserts,
   wherein the first insert is joined to the second insert by one or more loops of a continuous fiber tow that is wound around part of a radially outer surface of the first insert and around part of a radially outer surface of the second insert, the continuous fiber tow extends generally in the first direction within the flange part of the fitting and extends generally in the second direction within the base part and follows a curved path within a transition zone between the flange part and the base part, wherein at a second side of the base part distal from the flange part a concave upper surface of the base part has a second curvature and wherein the continuous fiber tow extends into the second side, following a curved path with a center of curvature that coincides with that of the second curvature.

5. The fitting of claim 4, wherein the continuous fiber tow extends into the second side of the base part beyond a top level of second connection hole on the concave upper surface of the base part.

6. The fitting of claim 4, wherein at a flange side of the base part the upper surface of the base part has a first curvature with a center of curvature that coincides with that of the curved path followed by the continuous fiber tow in the transition zone, the first and second curvatures of the concave upper surface have a common center of curvature.

7. The fitting of claim 4, wherein at a flange side of the base part the upper surface of the base part has a first curvature with a center of curvature that coincides with that of the curved path followed by the continuous fiber tow in the transition zone, the first and second curvatures of the concave upper surface have a different center of curvature.

8. The fitting of claim 1, wherein the radially outer surface of the first insert and/or the radially outer surface of the second insert comprises a groove or recess in which the continuous fiber tow is received.

9. A connection bracket comprising: the fitting of claim 1 and including a washer with a through hole arranged in alignment with the second connection hole, wherein an underside of the washer is at least partly shaped to match an upper surface of the base part of the fitting.

10. The connection bracket of claim 9, wherein the washer is a separate component.

11. The connection bracket of claim 9, wherein the washer is joined to the upper surface of the base part, to form an integral assembly.

12. A method of manufacturing the fitting according to claim 1, the method comprising steps of:
    placing the first insert in a mold configured to form the fitting, the first insert having the first insert bore with the first bore axis positioned normal to the first connection surface;
    placing the second insert in the mold, the second insert having the second insert bore with the second bore axis positioned normal to the second connection surface;
    winding the continuous fiber tow around part of a radially outer surface of the first insert and the second insert, to form at least one loop;
    wherein the continuous fiber tow extends in the first direction within the flange part and extends in the second direction within the base part and is guided to follow a curved path, when viewed in the third direction, perpendicular to the first direction and the second direction, in the transition zone between the first direction and the second direction; and molding the main body of the fitting around the first insert and the second insert and the continuous fiber tow using a molding compound.

13. The method of claim 12, further comprising a step of joining a washer to al upper surface of the base part of the fitting, the washer having a through hole in alignment with the second connection hole, wherein the washer is molded from a polymer material, and wherein the step of joining further comprises: curing the material of the washer and the material of the main body of the fitting, so as to establish a molecular chain bond between the materials.

14. The method of claim 13, wherein the washer has a convex underside, which is used during the step of winding to guide the continuous fiber tow in a curved path in the transition zone.

* * * * *